United States Patent
Pochtler

(10) Patent No.: US 10,427,180 B2
(45) Date of Patent: Oct. 1, 2019

(54) DEVICE FOR DISCHARGING FLUIDS

(71) Applicant: iSi GmbH, Vienna (AT)

(72) Inventor: Christian C. Pochtler, Vienna (AT)

(73) Assignee: iSi GmbH, Vienna (AT)

( * ) Notice: Subject to any disclaimer, the term of this patent is extended or adjusted under 35 U.S.C. 154(b) by 0 days.

(21) Appl. No.: 15/740,846

(22) PCT Filed: Jun. 27, 2016

(86) PCT No.: PCT/EP2016/064879
§ 371 (c)(1),
(2) Date: Dec. 29, 2017

(87) PCT Pub. No.: WO2017/001347
PCT Pub. Date: Jan. 5, 2017

(65) Prior Publication Data
US 2018/0193855 A1    Jul. 12, 2018

(30) Foreign Application Priority Data

Jul. 2, 2015 (EP) .................................. 15175080

(51) Int. Cl.
*B67D 1/04* (2006.01)
*B05B 9/08* (2006.01)
(Continued)

(52) U.S. Cl.
CPC ............ *B05B 9/0833* (2013.01); *A47J 43/12* (2013.01); *A47J 43/128* (2013.01);
(Continued)

(58) Field of Classification Search
CPC .. B67D 1/0418; B67D 1/0412; B67D 1/1252; B67D 2001/0089; B67D 2001/0481;
(Continued)

(56) References Cited

U.S. PATENT DOCUMENTS 2,330,774 A * 9/1943 Alexander ........... B67D 1/0418
                                                      222/399
3,250,288 A * 5/1966 Hammon ............ G05D 16/0663
                                                      137/116.3
(Continued)

FOREIGN PATENT DOCUMENTS

| AT | 411171 B | 10/2003 |
|---|---|---|
| EP | 2 377 622 A1 | 10/2011 |
| WO | 00/67628 A1 | 11/2000 |

OTHER PUBLICATIONS

International Search Report of PCT/EP2016/064879, dated Sep. 12, 2016.
(Continued)

*Primary Examiner* — Charles Cheyney
(74) *Attorney, Agent, or Firm* — Collard & Roe, P.C.

(57) ABSTRACT

A device for discharging fluids includes a container, to be opened and closed, which forms an interior space of the device for accommodating a spray medium; a capsule connector means in order to establish a fluidic connection between an exchangeable capsule filled with gas and the device; a discharge opening through which the spray medium can be discharged from the device interior space upon actuating the device. A pressure regulator is provided in order to guarantee the discharge of the spray medium, for example, in the form of hot chocolate, at a uniform pressure.

15 Claims, 5 Drawing Sheets

(51) Int. Cl.
*B05B 7/24* (2006.01)
*B65D 83/66* (2006.01)
*A47J 43/12* (2006.01)
*A47J 41/00* (2006.01)
*B65D 81/38* (2006.01)

(52) U.S. Cl.
CPC .......... *B05B 7/2429* (2013.01); *B65D 83/663* (2013.01); *A47J 41/00* (2013.01); *B65D 81/38* (2013.01)

(58) Field of Classification Search
CPC ............... B67D 1/0004; B67D 1/0885; Y10T 137/2607; B05B 9/0833; B05B 9/0805; B05B 9/0894
USPC .............................. 222/396, 399, 5, 61, 394
See application file for complete search history.

(56) References Cited

U.S. PATENT DOCUMENTS

| | | | | |
|---|---|---|---|---|
| 3,319,829 | A * | 5/1967 | Sentz | F17C 13/04 222/189.06 |
| 3,325,053 | A * | 6/1967 | de Boer | B67D 1/0412 137/116.5 |
| 3,558,010 | A * | 1/1971 | Zenger | B05B 1/30 141/19 |
| 3,679,104 | A * | 7/1972 | Giroud | B67D 1/0412 222/396 |
| 3,861,564 | A * | 1/1975 | Loeffler | B05B 11/06 222/80 |
| 4,370,997 | A * | 2/1983 | Braithwaite | F16K 17/04 137/116.3 |
| 4,552,477 | A * | 11/1985 | Braithwaite | B05C 17/0316 222/61 |
| 4,984,711 | A * | 1/1991 | Ellis | B67B 7/26 222/152 |
| 5,443,186 | A | 8/1995 | Grill | |
| 9,238,574 | B2 * | 1/2016 | Hollars | B67D 1/0412 |
| 9,919,910 | B2 * | 3/2018 | Gibson | B67D 1/0406 |
| 2011/0049193 | A1 * | 3/2011 | Muller Kubold | B67D 1/0412 222/399 |

OTHER PUBLICATIONS

European Search Report in EP 15 17 5080, dated Dec. 3, 2015, with English translation of relevant parts.

* cited by examiner

DEVICE FOR DISCHARGING FLUIDS

CROSS REFERENCE TO RELATED APPLICATIONS

This application is the National Stage of PCT/EP2016/064879 filed on Jun. 27, 2017, which claims priority under 35 U.S.C. § 119 of European Application No. 15175080.9 filed on Jul. 2, 2015, the disclosure of which is incorporated by reference. The international application under PCT article 21(2) was not published in English.

FIELD OF THE INVENTION

The present invention relates to an apparatus for discharge of fluids, the apparatus comprising: a container that is to be opened and closed, and forms a device interior space for accommodation of a spray medium; capsule connection means, in order to produce a fluidic connection between an exchangeable gas-filled capsule and the apparatus; a discharge opening through which the spray medium can be discharged from the device interior space when the apparatus is activated, wherein a pressure regulator is provided in order to guarantee discharge of the spray medium at a uniform pressure.

STATE OF THE ART

To this effect, AT 411171 B discloses a container for generation, storage, and discharge of foods in cream form, contained in a device interior space, particularly whipped cream and hot foods in whipped-up or sauce form, wherein the container is composed of a bottle and a head. In this regard, the bottle is filled, at the beginning, with the respective food to be sprayed out, and subsequently closed off using the head. In this regard, the food or the medium to be sprayed is present in the bottle in liquid form. The pressure in the device interior space increases by means of the introduction of a gas, preferably $N_2O$ or $CO_2$, from a capsule into the device interior space, in such a manner that the gas particles are dissolved in the food. During extraction or during spraying, the dissolved gas expands. In this way, foaming of the food can come about, i.e. transfer of the food into a state in cream form or in foam form or sauce form.

In this connection, the problem occurs that when the food in cream form is dispensed from the bottle through a discharge bore, the dispensing pressure drops in such a manner that uniform application of the cream, for example onto baked goods, is not possible.

Because of this problem, the user must often carry out corrections of the layer thickness, especially in the sector of patisserie, cuisine, and catering, and in this connection, it is very difficult to avoid possible irregularities.

Alternative solutions, in which the gas is supplied to the device interior space from the outside by means of a pressure hose, in order to ensure a constant gas pressure, must be evaluated as disadvantageous in that the handiness of such apparatuses and the local flexibility of use of such an apparatus are clearly restricted due to the required external pressure hose for supplying gas.

An apparatus for dispensing liquid soap disposed in a container is known from WO 00/67628. A cartridge is provided, which contains a fluid, for example CO2, that is under high pressure, and is introduced into the container in the gaseous state, in order to be able to press the liquid soap out of the container when needed, and finally out through an exit element. In order to ensure a constant pressure in the container, which pressure is clearly lower than that in the cartridge, a pressure regulator is provided, through which the fluid must flow out of the cartridge into the container.

TASK OF THE INVENTION

It is therefore a task of the invention to create an apparatus by means of which a cream, for example composed of jelly, aspic, egg, chocolate and the like, can be applied uniformly, wherein the handiness and local flexibility of the use of the apparatus are supposed to be as great as possible.

PRESENTATION OF THE INVENTION

In order to accomplish the stated task, it is provided, according to the invention, in the case of an apparatus for discharge of fluids, the apparatus comprising: a container that is to be opened and closed, and forms a device interior space for accommodation of a spray medium; capsule connection means, in order to produce a fluidic connection between an exchangeable gas-filled capsule and the apparatus; a discharge opening through which the spray medium can be discharged from the device interior space when the apparatus is activated, that a pressure regulator is provided in order to guarantee discharge of the spray medium at a uniform pressure. In this way, a compact apparatus is achieved, wherein no external means for generation of a pressure that allows uniform discharge are required. Thereby an extremely broad spectrum of use occurs in the sector of patisserie, cuisine, and catering, for spraying of foods.

In that the container can be opened and closed again, the medium that is to be sprayed can be disposed in the device interior space without problems. In order to allow opening and closing of the container is composed, in a typical embodiment of the apparatus according to the invention, of a bottle and a head that can be connected with the bottle, preferably screwed onto it. In other words, in the joined state, the bottle and the head form the device interior space. Of course, other embodiments are also conceivable, for example a container having a lateral opening that can be re-closed.

The spray medium is the fluid to be discharged, particularly a food. The spray medium can be identical with the medium, but it can also be formed by the medium and the gas.

A known capsule holder and a known capsule opening unit, for example, can be used as capsule connection means. The capsule holder serves to hold the capsule. With the capsule in place, the capsule holder is screwed onto the capsule opening unit, whereby the capsule is opened, for example in that a capsule cap that is disposed on a capsule neck of the capsule is pierced open by means of a pin of the capsule opening unit when the capsule holder provided with the capsule is screwed in. To guarantee a seal, a capsule seal can be provided, which is disposed in such a manner that when a fluidic connection exists between the capsule and the apparatus, particularly the device interior space, the capsule seal is disposed between the capsule opening unit and the capsule.

The capsule holder can comprise a mechanical locking mechanism, with which the capsule holder can be fixed in place. In this way, fixation of the capsule on the pressure regulator can be guaranteed during the entire period of handling by the user.

An activation element is typically provided for activation of the apparatus. The activation element is preferably configured as a lever having a lever spring, or as a spring-based pushbutton, in order to guarantee convenient handling for the user.

The discharge opening can be disposed in an extraction piston. Preferably, the discharge opening can be structured as a discharge bore, particularly preferably as a discharge bore in the extraction piston.

In addition, the extraction piston can be configured so that it can be disassembled for easier cleaning of the apparatus.

The function of the pressure regulator lies in regulating the high input pressure that corresponds to the capsule pressure to a defined spraying pressure for discharge, since the spraying pressure must be less than the input pressure, i.e. since the input pressure amounts to a multiple of the desired spraying pressure. Typically, the input pressure lies in a range from 150 bar to 250 bar, whereas the spraying pressure lies in a range from 1 bar to 10 bar. In this regard, in coordination of the device volume and of the maximal filling amount, the gas mass in the capsule must be selected in such a manner that proper function is guaranteed until complete emptying of the device.

In order to make this possible, the pressure regulator preferably comprises a low-pressure piston having a low-pressure piston spring and a low-pressure piston surface, as well as a high-pressure valve having a high-pressure valve tappet and a high-pressure valve spring, wherein a pressure can be applied to the low-pressure piston surface, by means of the gas from the capsule, such that the low-pressure piston spring is compressed and the high-pressure valve is closed.

In this regard, the gas is preferably argon, wherein different gases that are not soluble in the medium, which, as inert gas, make the spray medium, which is ultimately sprayed or discharged, capable of storage, i.e. bring about oxygen exclusion, for example $N_2$, can be used in the same manner.

The low-pressure piston spring is pre-stressed between the low-pressure piston and a fixed contact surface, so that a low-pressure piston spring force acts on the low-pressure piston, which presses the high-pressure valve tappet to the rear, counter to a high-pressure spring force, and thereby opens the high-pressure valve, thereby guaranteeing a gas flow from the input side all the way into the device interior space.

In order to guarantee a reliable gas flow in a flow direction from the capsule to the device interior space in this regard, it is provided, in a preferred embodiment of the apparatus according to the invention, that a kickback valve is provided between the capsule connection means and the device interior space, preferably in the region of the device interior space. In contrast, the gas flow opposite the flow direction is blocked by the kickback valve.

Furthermore, it is provided, in a preferred embodiment of the apparatus according to the invention, that the container is surrounded, at least in certain sections, by a thermal insulation, in order to prevent possible burn injuries to a user and in order to guarantee insulation of the spray medium to protect it from possibly cooling off. The apparatus according to the invention is therefore ideally suited both for cold uses and for hot uses, up to typically about 120° C. For example, uses in which hot chocolate is discharged at temperatures that are typically greater then 40° C. are conceivable.

Preferably, the apparatus according to the invention is suitable for keeping the medium contained in the bottle warm. The apparatus can be placed in a water bath, for example, for the purpose of keeping the medium warm or warming it up. The thermal insulation can be removed for this purpose, in order not to hinder warming the medium or keeping it warm.

In addition, in a preferred embodiment, the pressure regulator furthermore comprises a filter that protects the interior of the pressure regulator from possible contaminants.

Furthermore, it can be ensured, by means of a skilled design of the pressure regulator, that the pressure in the device interior space is kept constant at a value that clearly lies below the pressure in the capsule and preferably is equal to the spraying pressure. This has the advantage that the consistency of the spray medium is adjustable and can be kept constant. In particular, in this way it can be avoided that the consistency of the spray medium takes on an undesirable quality because of an overly high pressure in the device interior space, as can relatively frequently be the case, particularly for foods. For example, undesirable foaming caused by an overly high pressure can be prevented. For this reason, it is provided, in a preferred embodiment of the apparatus according to the invention, that the pressure regulator is disposed between the capsule connection means and the kickback valve. In other words, pressure regulation takes place on the input side with reference to the device interior Space.

In addition, the apparatus preferably comprises a pressure-relief valve that follows the actual pressure regulation. This pressure-relief valve is integrated into the pressure regulator for safety reasons, and limits the maximal pressure within the apparatus in the event of a system failure.

For this purpose, the pressure-relief valve is connected with the low-pressure piston in sealed manner, and opens in the event of a defined maximal gas pressure, thereby conducting the gas out of the apparatus. The higher the gas pressure, the higher the pressure force that moves the low-pressure piston in the direction of the fixed contact surface. If a high-pressure valve tappet disposed on the pressure-relief valve comes up against the fixed contact surface, then the high-pressure valve opens and the gas is conducted out of the apparatus through possible ventilation bores.

In this regard, in a further preferred embodiment, an additional kickback valve is provided, which is disposed between the capsule connection means and the pressure regulator. This kickback valve also opens only in one flow direction, thereby allowing the gas to flow only into the device interior space. In that the pressure regulator is thereby disposed between two kickback valves, viewed in the flow direction, the apparatus according to the invention can be made dishwasher-safe, since the pressure regulator can be sealed off with regard to other liquids by means of the kickback valves.

Furthermore, the pressure regulator, in a preferred embodiment, furthermore comprises a pressure-control valve that has a pressure-control valve piston with a pressure-control valve piston surface, wherein preferably, the pressure-control valve comprises a sealing cone. Furthermore, the pressure-control valve can comprise a reset element, preferably a spring-based reset element, for example a helical spring or a gas-pressure spring, which reset element presses the pressure-control valve piston in the flow direction at a defined reset force, in order to open the pressure-control valve.

When the capsule is opened, the gas flows into the pressure-control valve, preferably by way of an inlet bore, and when the pressure-control valve is open, it flows from there into the pressure regulator, particularly into the high-pressure valve.

Particularly when the high-pressure valve is closed, the gas pressure that acts on the pressure-control valve piston surface rapidly increases due to the input pressure, until the resulting force is greater than the reset force applied by the reset element, whereupon the pressure-control valve piston closes the pressure-control valve, preferably in that the pressure-control valve piston is pressed toward the sealing cone, counter to the flow direction.

Preferably, however, it is also possible to do without a separate reset element, in that a face-side partial surface of the pressure-control valve piston is provided, which is disposed opposite the pressure-control valve piston surface and facing away from it, and has a different, preferably a lesser size than the pressure-control valve piston surface. In that not only the pressure-control valve piston surface but also the face-side partial surface of the pressure-control piston are exposed to a gas pressure, pressure forces of different sizes, directed against one another, can act on the pressure-control piston and thereby move it back and forth. Accordingly, the pressure-control valve can also be opened and closed without a separate reset element.

In concrete terms, in this regard, the pressure-control valve is designed in such a manner that when the capsules is open and the pressure-control valve is closed, only a fluidic connection of the capsule with the face-side partial surface, but not with the pressure-control valve piston surface, exists. Accordingly, the gas pressure increases only on the side of the partial surface of the pressure-control valve piston, due to the input pressure, until the pressure force that acts on the partial surface is greater than the pressure force that acts on the pressure-control valve piston surface, so that the pressure-control valve piston is moved, preferably in the flow direction, in order to open the pressure-control valve.

When the high-pressure valve is open, the gas pressure now increases also on the side of the pressure-control valve piston surface, so that this pressure essentially becomes equally great as the pressure on the side of the partial surface. However, since the partial surface is smaller than the pressure-control valve piston surface, the resulting pressure force that acts on the pressure-control valve piston surface is greater than the pressure force that acts on the partial surface, and the pressure-control piston is moved back again, preferably counter to the flow direction, in order to close the pressure-control valve.

Both in the presence and in the absence of the reset element, the gas is conducted out of the pressure regulator when the high-pressure valve is open, preferably by way of an outlet bore in a regulator core.

In a further preferred embodiment, the apparatus comprises a second pressure regulator, wherein the second pressure regulator precedes the first pressure regulator. In that two pressure regulators, switched one behind the other, are provided, the regulation precision is improved; in particular, regulation deviations of the first pressure regulator are reduced by the second pressure regulator.

In order to make this possible, the second pressure regulator preferably comprises an additional low-pressure piston having an additional low-pressure piston spring and an additional low-pressure piston surface, as well as an additional high-pressure valve having an additional high-pressure valve tappet and an additional high-pressure valve spring, wherein a pressure can be applied to the additional low-pressure piston surface by means of the gas from the capsule, such that the additional low-pressure piston spring is compressed and the additional high-pressure valve is closed.

Switching the second pressure regulator ahead of the first pressure regulator can particularly be implemented by means of a fluidic connection between the high-pressure valve of the first pressure regulator and the additional low-pressure piston surface of the second pressure regulator.

In a preferred embodiment of the apparatus according to the invention, it is provided that at least One nozzle connection means is provided for production of a fluidic connection between an exchangeable nozzle and the discharge opening. Preferably, the at least one nozzle connection means accommodates the nozzle, in this regard. The at least one nozzle connection means allows the use of the most varied types of nozzles through which the spray medium is ultimately discharged. Accordingly, different spray profiles can be achieved with the apparatus according to the invention, i.e. these can be easily adjusted by means of selection and installation of the corresponding nozzles.

In a particularly preferred embodiment of the apparatus according to the invention, it is provided that the at least one nozzle connection means comprises a lower nozzle screw connection and/or an upper nozzle screw connection, which is/are disposed along the discharge opening, wherein preferably an exchangeable nozzle is disposed in the upper screw connection. For one thing, this is a particularly simple manner, in terms of design, for implementing nozzle connection means. For another, the nozzle screw connections also allow affixation of filling spouts or decorating spouts having different dimensions. Accordingly, different spray profiles can be achieved with the apparatus according to the invention, i.e. these can easily be set by means of selection and installation of the corresponding filling spouts or decorating spouts.

In this regard, the lower nozzle screw connection and the upper nozzle screw connection can be configured in one piece with one another. Furthermore, the lower nozzle screw connection can be connected with the bottle in inseparable manner.

In detail, the extraction piston is guided from an inner side of the head in a related piston bore, and pushed through a recess on the activation element, for example on the lever. In this regard, the lever is attached to the head by means of a pressed-in axle pin, and is pre-stressed with the lever spring. In this regard, the extraction piston is screwed into the lower nozzle screw connection in such a manner that an axial movement of the extraction piston is guaranteed and the extraction piston is pre-stressed by way of the lever spring. The pre-stress presses a seal of the extraction piston against a sealing bed disposed in the head, and ensures a sealing function even if no pressure prevails in the device interior space. In this regard, the nozzle is preferably fixed in place with the lower nozzle screw connection, in exchangeable manner by way of the upper nozzle screw connection.

The extraction piston moves downward by means of activation of the lever, and gives up its sealing effect, thereby allowing the spray medium to be conducted through the discharge bore and further, through the nozzle, out of the apparatus, by means of the gas pressure that has been built up in the interior or in the device interior space.

BRIEF DESCRIPTION OF THE FIGURES

The invention will now be explained in greater detail using exemplary embodiments. The drawings are examples and are intended to explain the idea of the invention, but not in any way to restrict it or to present it conclusively.

The figures show.

WAYS TO IMPLEMENT THE INVENTION

Figure 1:
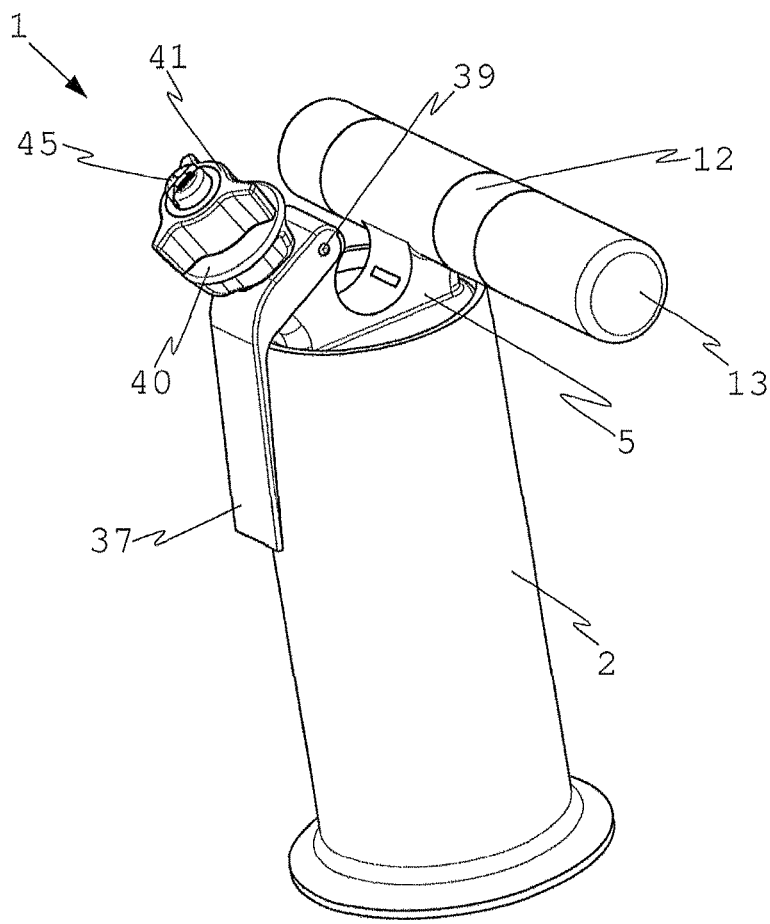
FIG. 1 a perspective representation of a system according to the invention, having an apparatus according to the invention for discharge of fluids at uniform pressure.
Figure 2:
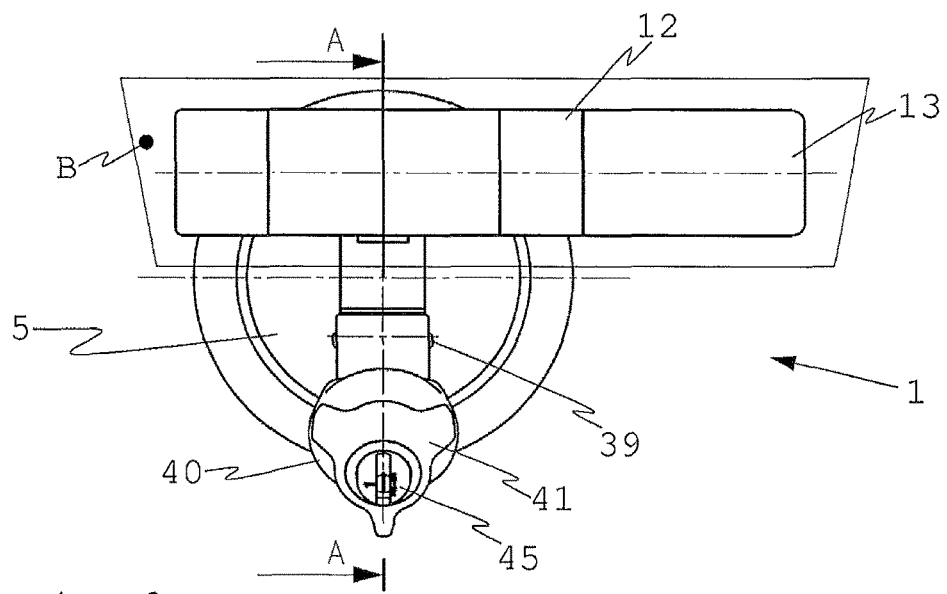
FIG. 2 a top view of the system according to the invention.

In FIG. 1 and FIG. 2, an apparatus 1 according to the invention can be seen, which comprises a container that can be opened and closed again. In this regard, in the exemplary embodiments shown, the container is composed of a bottle 3 and a head 5 that can be screwed onto the bottle 3.

For protection against possible burn injuries, as well as for better handling, a thermal bottle insulation 2 is preferably provided, in which the bottle 3 is disposed.

The bottle 3 and the head 5 form a device interior space 7 of the container in a joined-together state, in which device interior space 7 a medium, preferably a food, which is supposed to be discharged or sprayed, can be disposed. Discharge takes place by means of a gas that is under pressure.

In the following, the fluid to be discharged is referred to as the spray medium 4, which can be identical with the medium or can be composed of the medium and the gas.

In the figures, a system according to the invention is shown, which comprises the apparatus 1 according to the invention and an exchangeable capsule 8, filled with the gas, wherein in the system shown in the figures, the capsule 8 stands in a fluidic connection with the apparatus 1. The latter is achieved by means of capsule connection means of the apparatus 1, which comprise a capsule holder 12 and a capsule opening unit 15.

The capsule holder 12 is disposed on the head 5. The capsule 8, filled with gas, preferably argon, is disposed on the capsule holder 12, in such a manner that a fluidic connection between the capsule 8 and the apparatus 1 is guaranteed, wherein for a better grasping possibility, for temperature insulation, and as a damping element, a capsule holder cover 13 surrounds the capsule holder 12, at least in part. In this regard, the capsule holder 12 is connected with the pressure regulator 14, which is preferably fixed in place in a regulator housing 59, which regulator housing 59 is particularly preferably formed by the head 5, by means of a connection thread disposed on the pressure regulator 14, preferably screwed on, wherein possible different connection forms, for example a snap-on connection or a bayonet connection, are also possible. In the same manner, it is possible that the pressure regulator 14 is disposed directly on the bottle 3.

Figure 3:
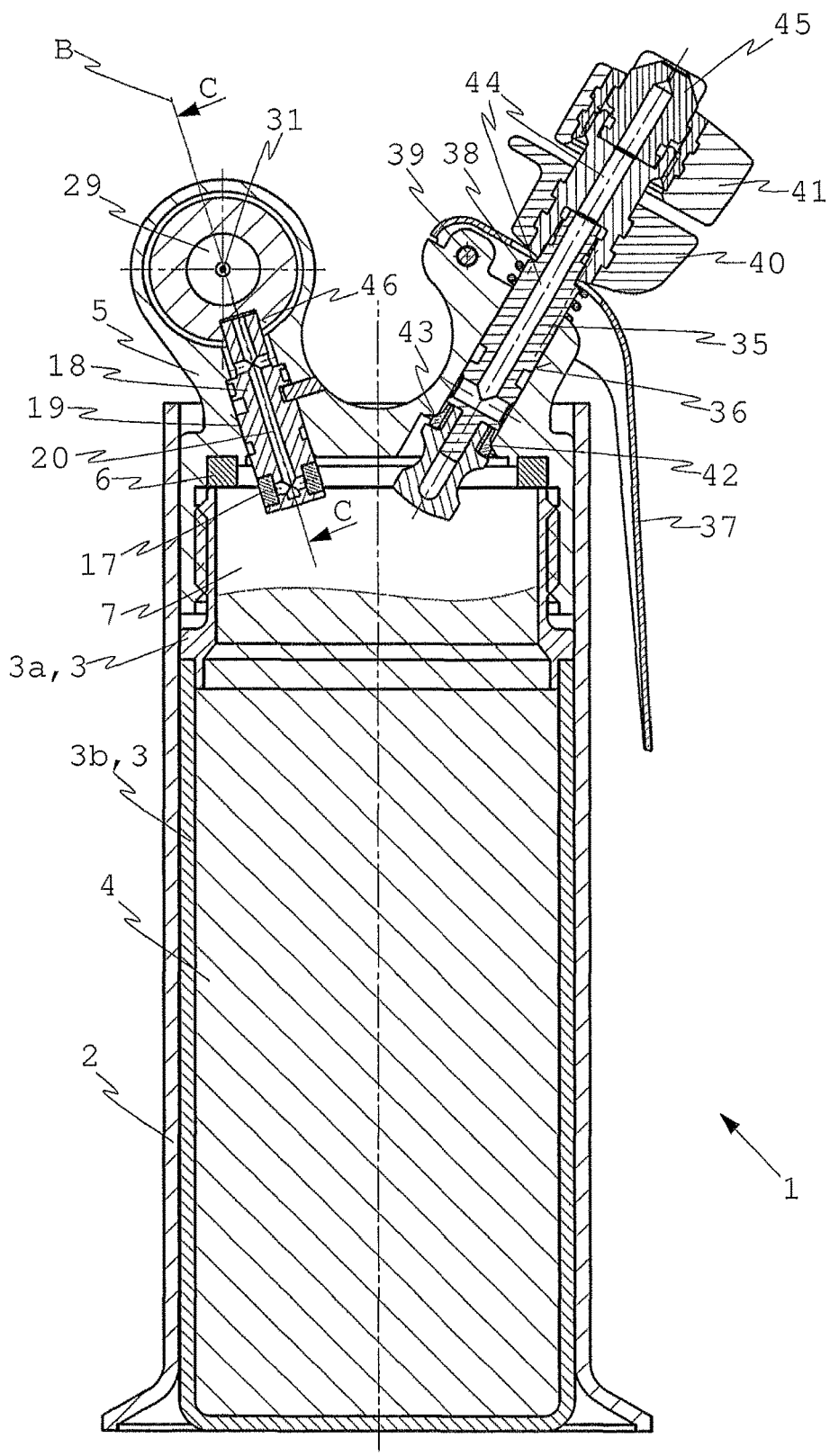
FIG. 3 a sectional representation of the system according to the invention, wherein the section A-A is drawn in FIG. 2.

Activation of the apparatus 1 takes place, according to FIG. 3, by means of an activation element 37, preferably disposed on the head 5, which element can be configured as a spring-based 38 lever with an axle pin 39, as well as a spring-based 38 pushbutton. By means of activation of the activation element 37, the spray medium 4 is discharged from the bottle 3 by means of an extraction piston 35, which is disposed in a piston bore 36 in the head 5, through a discharge bore 44 or preferably through an exchangeable nozzle 45 that is disposed along the discharge bore 44. In detail, a lower nozzle screw connection 40 and an upper nozzle screw connection 41 are disposed along the discharge bore 44 in the embodiment shown, wherein the exchangeable nozzle 45 is disposed on the upper nozzle screw connection 41. In the same manner, however, the lower nozzle screw connection 40 and the upper nozzle screw connection 41 could be configured in one piece with one another. To guarantee a reliable gas flow in a flow direction from the capsule 8 to the device interior space 7, a kickback valve 17 is disposed in the region of the device interior space 7.

In the preferred embodiment shown in the figures, the pressure regulator 14 is disposed on the head 5, between the capsule 8 and the kickback valve 17, in order to guarantee uniform application of the spray medium 4, wherein the pressure regulator 14 can be disposed not only on the head 5 but rather also on the bottle 3, for example. In this connection, it should be noted that the extraction piston 35 is sealed off, according to FIG. 3, by means of a seal 42 that lies against a sealing bed 43 formed by the head 5, to prevent a possible exit of gas through the piston bore 36. Also, the bottle 3 shown in FIG. 3 is configured in two parts, with an upper bottle half 3a that has a thread, and a lower bottle half 3b, wherein the two bottle halves 3a, 3b are preferably pressed or welded together with one another. In the same manner, it is also possible that the bottle 3 is configured in one piece.

A head seal 6 is also disposed between head 5 and bottle 3 in order to prevent a possible gas exit, in such a manner that its flat surfaces lie against head 5 and bottle 3 or, if applicable, upper bottle half 3a, wherein the head is screwed onto the bottle 3 having the head seal 6 disposed on between, by way of a connection thread, and thereby the device interior space 7 is sealed in itself, and the spray medium 4 contained in it is enclosed.

The kickback valve 17 is disposed in the region of the device interior space 7 using a kickback valve support 18, wherein the kickback valve support 18 is held in place by means of a kickback valve support bore 19 situated in the head 5 and a pressure regulator housing bore 46 situated in the pressure regulator 14, and allows a connection between pressure regulator 14 and kickback valve 17 by means of a kickback valve bore 20. In other words, the pressure regulator 14 is positioned in such a manner that the pressure regulator housing bore 46 accommodates the kickback valve support 18. By means of this connection, an anti-twist mechanism is guaranteed, for one thing, and fixation of the pressure regulator 14 in the axial direction is guaranteed, for another. Thereby a gas flow from the pressure regulator 14 into the device interior space 7, by way of the kickback valve 17, is guaranteed by way of the kickback valve bore 20. In this regard, the kickback valve 17 opens only in the flow direction, thereby allowing gas to flow only in the direction of the device interior space 7, but not back in the direction of the pressure regulator 14.

The extraction piston 35 is conducted from the inner side of the head into the piston bore 36, and pushed through a recess on the activation element 37. In the embodiments shown in the figures, the activation element 37 is a lever. The lever 37 is attached to the head 5 with the pressed-in axle pin 39, and pre-stressed by means of the lever spring 38. The extraction piston 35 is screwed into the lower nozzle screw connection 40, thereby guaranteeing an axial movement of the extraction piston 35 and pre-stressing the extraction piston 35 by way of the lever spring 38. The pre-stress presses the seal 42 of the extraction piston 35 against the sealing bed 43 and ensures a sealing function even without any pressure prevailing in the device interior space 7.

By activation of the lever 37, the extraction piston 35 moves downward and gives up its sealing effect, thereby allowing the spray medium 4 to be conducted through the discharge bore 44 and further, through the nozzle 45, out of the apparatus 1, by means of the gas pressure that has built up in the interior or in the device interior space 7. In this regard, it should be noted that in the embodiments shown, when the apparatus 1 is in use, it must be turned over in such a manner that the head 5 is oriented at least approximately on the floor side or downward, i.e. facing in the direction of gravity.

Figure 4:
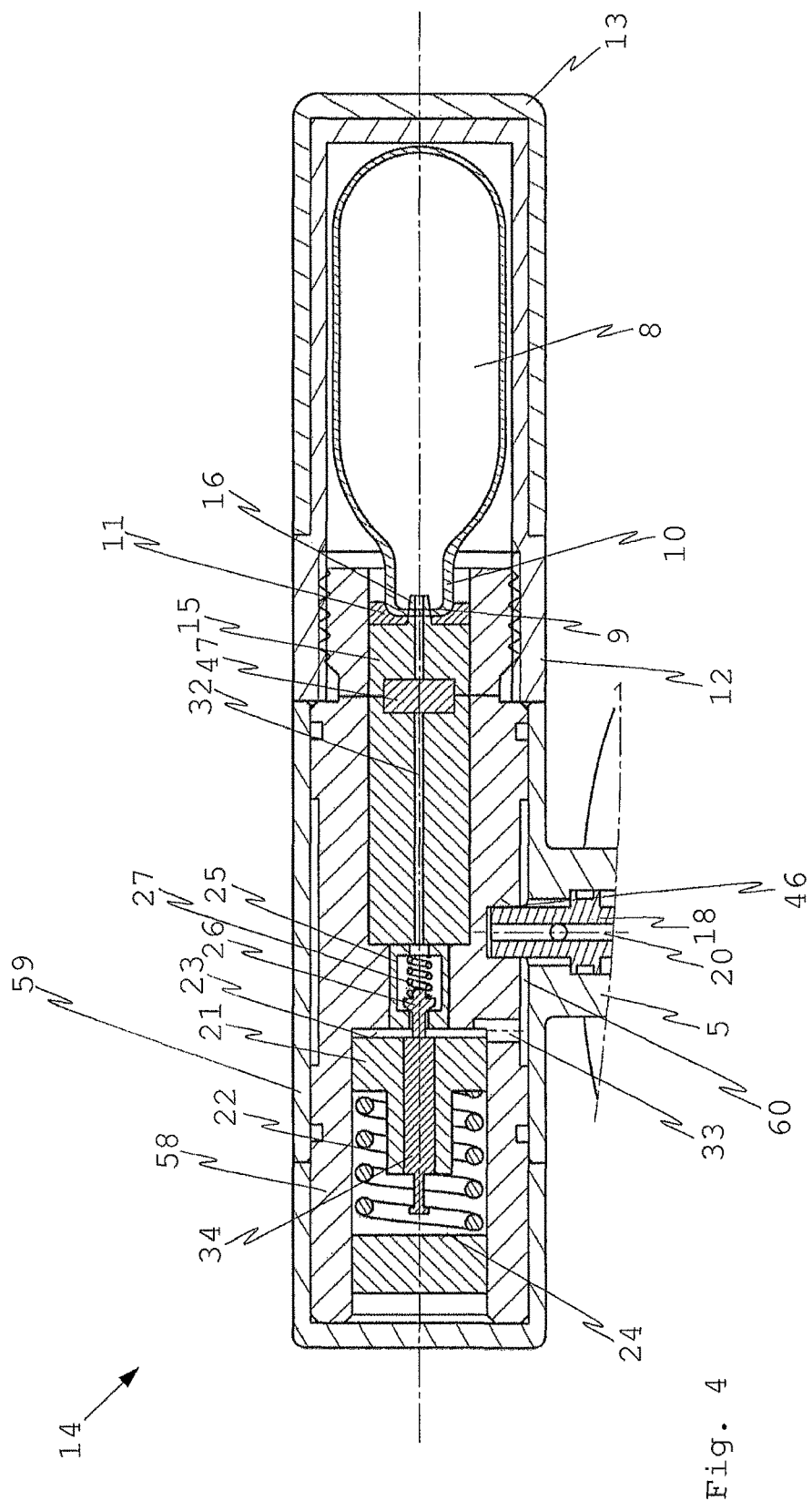
FIG. 4 a sectional representation of a pressure regulator of a first embodiment of the apparatus according to the invention, wherein the section plane B is drawn in FIG. 2 and the section direction C is drawn in FIG. 3.
Figure 5:
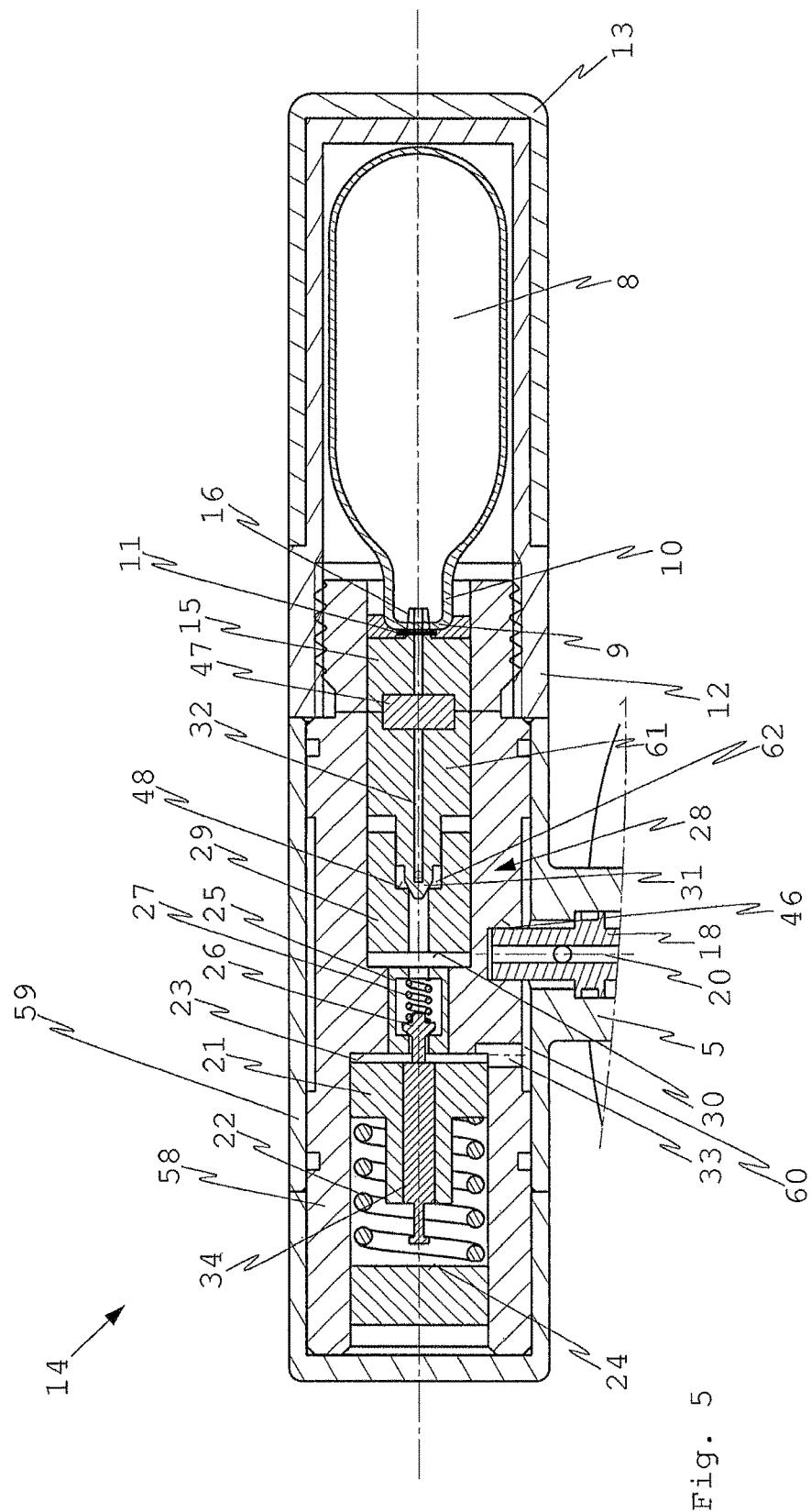
FIG. 5 a sectional representation of the pressure regulator of a second embodiment of the apparatus according to the invention, having a pressure-control valve, wherein the section plane B is drawn in FIG. 2 and the section direction C is drawn in FIG. 3.

FIG. 4 shows the pressure regulator 14 in a first embodiment of the apparatus 1 according to the invention, having a low-pressure piston 21, a low-pressure piston spring 22, and a low-pressure piston surface 23. In contrast, FIG. 5 shows a second embodiment according to the invention, in which a pressure-control valve 28 is additionally provided, which has a pressure-control valve piston 29 having a pressure-control valve piston surface 30, wherein the pressure-control valve 28 comprises a sealing cone 31 that is configured at the end of a block 61, viewed in the flow direction. In this regard, a filter 47 is additionally disposed in or ahead of the pressure regulator 14 for protection against possible contaminants. In this regard, a pressure-relief valve having a pressure-relief valve tappet 34 is preferably disposed after or in the pressure regulator 14, for protection of the apparatus 1 and of the pressure regulator 14, wherein a rupture disk, for example, can also be used. This rupture disk could be disposed anywhere where it comes into contact with a pressure within the bottle 3. The pressure-relief valve limits the maximal pressure within the apparatus 1 in the event of a system failure of the pressure regulator 14. In this regard, the pressure-relief valve is connected with the low-pressure piston 21 in firm and tight manner, and opens in the event of a defined maximal gas pressure, thereby causing gas to be conducted out of the apparatus 1.

The higher the gas pressure, the higher the pressure force that moves the low-pressure piston 21 in the direction of a fixed contact surface 24. If the pressure-relief valve tappet 34 makes contact with the fixed contact surface 24, the pressure-relief valve opens, wherein the gas is conducted out of the apparatus 1 through possible ventilation bores (not shown).

In this regard, the low-pressure piston spring 22 is pre-stressed between the low-pressure piston 21 and the fixed contact surface 24, wherein a low-pressure piston spring force acts on the low-pressure piston 21, which presses a high-pressure valve tappet 26 toward the rear, i.e. counter to the flow direction, counter to a high-pressure spring force of a high-pressure valve spring 27 of the high-pressure valve 25, and thereby opens the high-pressure valve 25, thereby making a gas flow from the input side all the way into the device interior space 7 possible. It should be noted that in spite of the same cross-hatching in the figures, the high-pressure valve tappet 26 and the pressure-relief valve tappet 34 are two separate elements, independent of one another.

In detail, in the second embodiment shown in FIG. 5, an input pressure corresponding to the capsule pressure is reduced to a defined or desired spraying pressure in two stages. On the input side, there is a pressure-control valve 28, which reduces the gas pressure to a value lower than the capsule pressure as a first step, preferably by a factor of 0.25, wherein a range from 0.1 to 0.5 can also be implemented technically. The second pressure stage is based on pressure regulation by means of a piston design, thereby reducing the pressure further by a factor of preferably 0.1, wherein a range from 0.05 to 0.2 can also be implemented technically. A resulting gas pressure, which preferably corresponds to the spraying pressure, is subsequently supplied to the device interior space 7, i.e. to the fluid to be processed.

Furthermore, in the second embodiment of the apparatus 1 according to the invention, the pressure regulator 14, as has already been mentioned, comprises the pressure-control valve 28, which has the pressure-control valve piston 29 having a pressure-control valve piston surface 30, wherein the pressure-control valve 28 comprises the sealing cone 31 (cf. FIG. 5).

Furthermore, the pressure-control valve 28 can have a reset element, preferably a spring-based reset element (not shown), for, example a helical spring or a gas-pressure spring, which reset element presses the pressure-control valve piston 29 in the flow direction at a defined reset force, in order to open the pressure-control valve 28.

Thereby the gas flows into the pressure-control valve 28, in a radial direction, by way of an inlet bore 32 in the block 61, as the result of opening of the capsule 8, and further from there, into the high-pressure valve 25, by way of a transition bore.

Particularly in the case of a closed high-pressure valve 25, the gas pressure acting on the pressure-control valve piston surface 30 increases rapidly, until the resulting force is greater than the reset force applied by the reset element, whereupon the pressure-control valve piston 29 is pressed toward the sealing cone 31, counter to the flow direction, and the pressure-control valve 28 is thereby closed.

FIG. 5, however, represents a preferred embodiment in which a separate reset element is eliminated. This is made possible in that a face-side partial surface 48 of the pressure-control valve piston 29 is provided, which surface is disposed opposite and facing away from the pressure-control valve piston surface 30, and has a different size, preferably a smaller size than the pressure-control valve piston surface 30.

When the capsule 8 is open and the pressure-control valve 28 is closed, only a fluidic connection of the capsule 8 with the face-side partial surface 48 exists, but not with the pressure-control piston surface 30. Correspondingly, the gas pressure increases only in the volume 62, due to the input pressure, until the pressure force that acts on the partial surface 48 is greater than the pressure force acting on the pressure-control valve piston surface 30, so that the pressure-control valve piston 29 is moved in the flow direction in order to open the pressure-control valve 28.

When the high-pressure valve 25 is closed, the gas pressure now increases also on the side of the pressure-control valve piston surface 30, so that this pressure becomes essentially equally great as the pressure on the side of the partial surface 48. However, since the partial surface 48 is smaller than the pressure-control valve piston surface 30, the resulting pressure force that acts on the pressure-control valve piston surface 30 is greater than the pressure force that acts on the partial surface 48, and the pressure-control valve 29 is moved back again, counter to the flow direction, in order to close the pressure-control valve 28. In this manner, opening and closing of the pressure-control valve is thereby brought about even without a separate reset element.

Both in the presence of a reset element and in the case shown in FIG. 5, where no separate reset element is provided, the gas is conducted out of the pressure regulator 14 by way of an outlet bore 33 in a regulator core 58 when the high-pressure valve 25 is open. In this regard, a groove 60 follows the outlet bore 33 and connects the outlet bore 33 fluidically with the pressure regulator housing bore 46 or the kickback valve support bore 19, so that the gas can flow into the kickback valve bore 20 and thereby ultimately into the device interior space 7. In this regard, the groove 60 is sealed off toward the outside by means of the regulator housing 59 or the head 5.

In the second pressure stage, the pressure of the gas flowing in from the high-pressure stage acts on the low-pressure piston surface 23, wherein the increasing pressure acts counter to the low-pressure piston spring 22 and the high-pressure valve tappet 26 of the high-pressure valve 25 closes once the desired spray pressure has been reached.

By extraction of the cream that has been formed or of the spray medium 4, the volume that is available to the gas in the device interior space 7 increases, and thereby the output pressure or the gas pressure that is exerted on the low-pressure piston surface 23 decreases. The low-pressure piston spring force is stronger, starting at a certain point, than the pressure force exerted by the gas on the low-pressure piston surface 23. As a result, the low-pressure piston 21 presses the high-pressure valve tappet 26 toward the rear or back, viewed in the flow direction, thereby opening the high-pressure valve 25. During extraction of the spray medium 4 or of the cream that is formed, by means of spraying, the high-pressure valve 25 constantly closes and opens, in order to create an equalization of force and thereby to keep the output pressure constant at the desired spraying pressure.

Accordingly, in the embodiment according to FIG. 5, the pressure-control valve 28 also closes and opens constantly, thereby guaranteeing very precise pressure regulation in total.

In addition, in order to avoid a possible gas exit between the capsule 8 and the related capsule opening unit 15, a capsule seal 11 is provided, wherein the capsule 8 or a capsule cap 9 that is disposed on a capsule neck 10 is pierced open by means of a pin 16 when the capsule holder 12 provided with the capsule 8 is screwed in. In addition, centering of the capsule 8 takes place by means of the placement of the capsule 8 in the capsule holder 12, when the capsule holder 12 is screwed into the pressure regulator 14, wherein preferably, the pin 16 penetrates the capsule cap 9 of the capsule 8 at a defined number of screw revolutions. At the moment of opening, the capsule 8 is sealed off with the capsule seal 11, in such a manner that the exiting gas can flow only into the interior of the pressure regulator 14. In this regard, the capsule opening unit 15 is designed in such a manner that a gas flow is only made possible by opening of a capsule 8. If no capsule 8 is positioned relative to the capsule opening unit 15, the interior of the pressure regulator 14 is sealed off with regard to the surroundings.

In the same manner, it is possible that instead of a capsule opening unit 15, a seal having an opening device, which is activated by means of a pin, for example, is disposed directly on the capsule 8. In this regard, it is also possible that an additional kickback valve is disposed between the capsule 8 and the pressure regulator 14.

Figure 6:
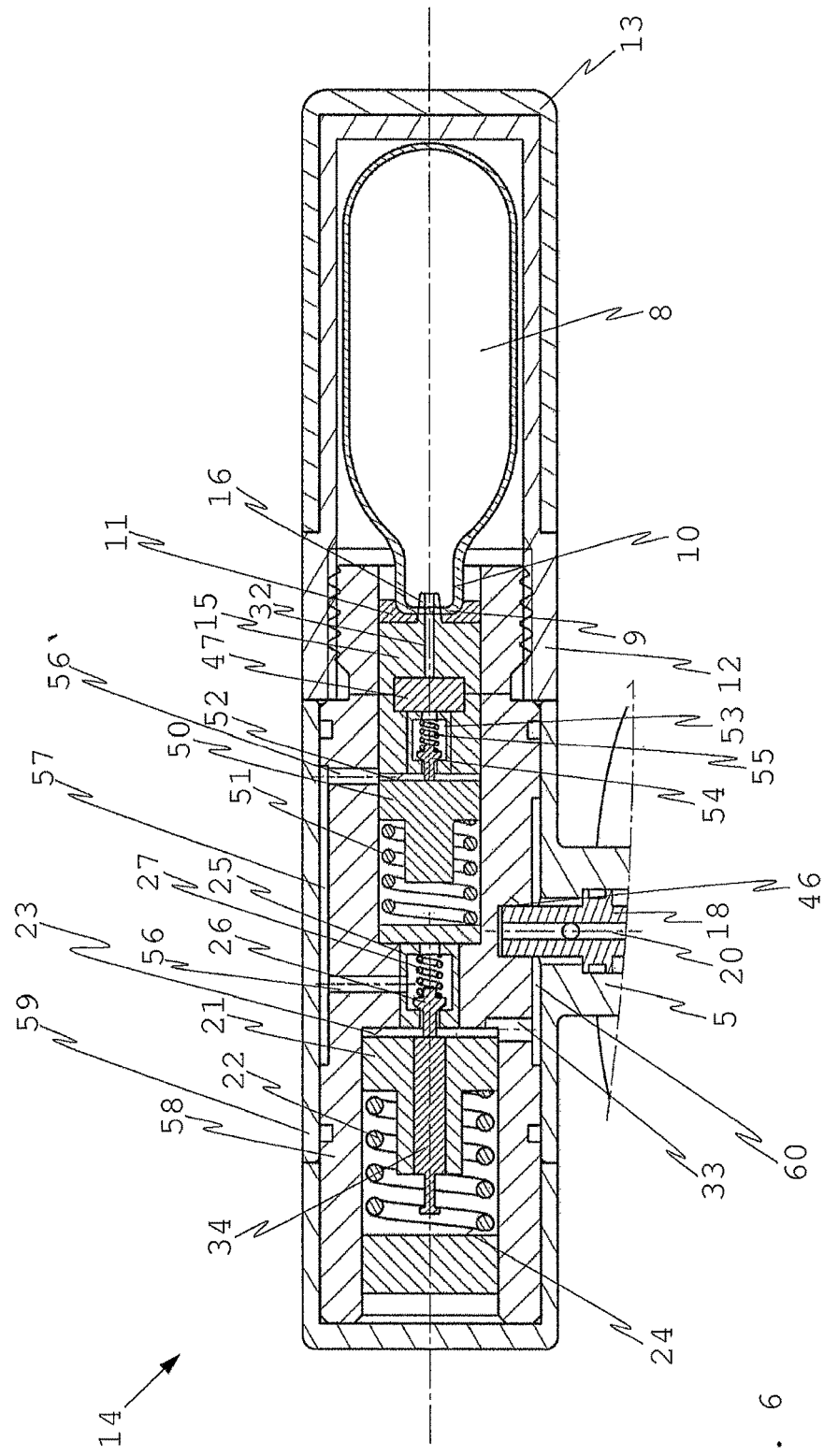
FIG. 6 a sectional representation of the pressure regulator of a third embodiment of the apparatus according to the invention, having a second pressure regulator, switched ahead of the first, wherein the section plane B is drawn in FIG. 2 and the section direction C is drawn in FIG. 3.

In the third embodiment, shown in FIG. 6, the apparatus 1 according to the invention has a second pressure regulator, switched in between, which comprises an additional low-pressure piston 50 having an additional low-pressure piston surface 52, as well as an additional low-pressure piston spring 51. Likewise, the second pressure regulator has an additional high-pressure valve tappet 54 as well as an additional high-pressure valve 53 for reduction of regulation deviations. In this regard, the additional high-pressure valve 53 has an additional high-pressure valve spring 55 that presses in the flow direction and counter to the additional high-pressure valve tappet 54 with an additional high-pressure spring force. Thereby a method of functioning of the second pressure regulator results, which is completely analogous to the method of functioning of the pressure regulator 14 of FIG. 4 that was described above, wherein the second pressure regulator is switched ahead of the first pressure regulator 14.

In concrete terms, the pressure of the gas flowing in from the high-pressure stage acts on the low-pressure piston surface 23 in the low-pressure stage. This increasing pressure force acts counter to the regulation spring force of the low-pressure piston spring 22, and the high-pressure valve 25 closes when the desired spraying pressure has been reached. By means of extraction of the cream that has been formed or of the spray medium 4, the volume in the device interior space 7 that is available for the gas increases, and thereby the output pressure or the gas pressure that is exerted on the low-pressure piston surface 23 decreases. The regulation spring force of the low-pressure valve is strong, starting from a certain point in time, than the pressure force exerted on the low-pressure piston surface 23 by the gas, and the low-pressure piston 21 opens the high-pressure valve 25, in that the high-pressure valve tappet 26 is pressed to the rear, viewed in the flow direction.

The high-pressure valve 25 and the additional low-pressure piston surface 52 are connected with one another fluidically, for example by way of a channel, so that when the high-pressure valve 25 is open, the gas pressure that ultimately also prevails in the device interior space 7 acts on the additional low-pressure piston surface 52. In the exemplary embodiment of FIG. 6, two radial bores 56, 56' as well as a groove 57 that connects the radial bores 56, 56' are provided in the regulator core 58 for a fluidic connection between the high-pressure valve 25 and the additional low-pressure piston surface 52. The groove 57 is sealed off toward the outside by means of the regulator housing 59. This allows a gas flow between the additional low-pressure piston surface 52 and the high-pressure valve 25. It should be noted that the groove 57 is neither identical to the groove 60 nor stands in a fluidic connection with it.

The pressure force of the gas that acts on the additional low-pressure piston surface 52 acts counter to the regulation spring force of the additional low-pressure piston spring 51, and the additional high-pressure valve 53 closes when a specific pressure has been reached. This specific pressure is typically slightly greater than, preferably equal to the spraying pressure. At a low gas pressure, the spring force of the additional low-pressure piston spring 51 is greater, starting from a certain point in time, than the force resulting on the low-pressure piston surface 52 due to the gas pressure, and the additional low-pressure piston 50 opens the additional high-pressure valve 53.

In the case of extraction of the spray medium 4 or of the cream that has been formed, as the result of spraying, and an open high-pressure valve 25, the additional high-pressure valve 53 also closes and opens constantly, in order to equalize the forces and thereby to keep the output pressure constant, and thereby, in interplay with the pressure regulator 14, extremely precise pressure regulation to the desired spraying pressure is achieved.

Furthermore, it is possible that the capsule holder 12 has a mechanical locking mechanism, with which the capsule holder 12 can be fixed in place, and that the extraction piston 35 is configured so that it can be disassembled for easier cleaning of the apparatus 1.

REFERENCE SYMBOL LIST 1 apparatus
2 bottle insulation
3 bottle
3a upper bottle half with thread
3b lower bottle half
4 spray medium
5 head
6 head seal
7 device interior space
8 capsule
9 capsule cap
10 capsule neck
11 capsule seal
12 capsule holder
13 capsule holder cover
14 pressure regulator
15 capsule opening unit
16 pin
17 kickback valve
18 kickback valve support
19 kickback valve support bore
20 low-pressure valve bore
21 low-pressure piston
22 low-pressure piston spring
23 low-pressure piston surface
24 contact surface
25 high-pressure valve
26 high-pressure valve tappet
27 high-pressure valve spring
28 pressure-control valve
29 pressure-control valve piston
30 pressure-control valve piston surface
31 sealing cone
32 inlet bore
33 outlet bore
34 pressure-relief valve tappet
35 extraction piston
36 piston bore
37 activation element (lever, pushbutton, and the like)
38 lever spring
39 axle pin
40 lower nozzle screw connection
41 upper nozzle screw connection
42 seal of the extraction piston 35
43 sealing bed
44 discharge bore
45 nozzle
46 pressure-regulator housing bore
47 filter
48 face-side partial surface of the pressure-control valve piston
50 additional low-pressure piston
51 additional low-pressure piston spring
52 additional low-pressure piston surface
53 additional high-pressure valve
54 additional high-pressure valve tappet
55 additional high-pressure valve spring
56, 56' radial bore
57 groove that fluidically connects the radial bores 56, 56'
58 regulator core
59 regulator housing
60 groove that fluidically connects the outlet bore 33 with the pressure-regulator housing bore 46 and the kickback valve support bore 19
61 block
62 volume between the block 61 and the pressure-control valve piston 29, which volume is restricted, in certain sections, by the partial surface 48

The invention claimed is:

1. Apparatus for discharge of fluids, the apparatus comprising:
a container that is to be opened and closed, and forms a device interior space for accommodation of a spray medium;
a capsule connector, in order to produce a fluidic connection between an exchangeable gas-filled capsule and the apparatus;
a discharge opening through which the spray medium can be discharged from the device interior space when the apparatus is activated; and
a first pressure regulator provided in order to guarantee discharge of the spray medium at a uniform pressure;
wherein the first pressure regulator comprises a low-pressure piston, a low-pressure piston spring, and a high-pressure valve, the low-pressure piston having a low-pressure piston surface, the high-pressure valve having a high-pressure valve tappet and a high-pressure valve spring;
wherein the high-pressure valve tappet comprises a conical section and a cylindrical section adjoining the conical section;
wherein the cylindrical section of the high-pressure tappet presses against the low-pressure piston;
wherein such a pressure can be applied to the low-pressure piston surface via the gas from the capsule, such that the low-pressure piston spring is compressed and the high-pressure valve is closed; and
wherein the first pressure regulator further comprises a pressure-control valve disposed between the capsule connector and the high-pressure valve along a flow path of the gas from the capsule, wherein the pressure-control valve has a pressure-control valve piston and a sealing cone, the pressure-control valve piston having a pressure-control valve piston surface and a face-side partial surface facing away from the pressure-control valve piston surface for pressing on the sealing cone.

2. Apparatus according to claim 1, further comprising a kickback valve between the capsule connector and the device interior space in order to guarantee a reliable gas flow in a flow direction from the capsule to the device interior space.

3. Apparatus according to claim 2, wherein the pressure regulator is disposed between the capsule connector and the kickback valve.

4. Apparatus according to claim 1, further comprising a thermal insulation surrounding the container, at least in certain sections.

5. Apparatus according to claim 1, further comprising a pressure-relief valve that follows the pressure regulator.

6. Apparatus according to claim 1, further comprising an additional kickback valve, which is disposed between the capsule connector and the first pressure regulator.

7. Apparatus according to claim 1, further comprising a second pressure regulator;
wherein the second pressure regulator is switched ahead of the first pressure regulator.

8. Apparatus according to claim 7, wherein the second pressure regulator comprises an additional low-pressure piston, an additional low-pressure piston spring, and an additional high-pressure valve, the additional low-pressure piston having an additional low-pressure piston surface, the additional high-pressure valve having an additional high-pressure valve tappet and an additional high-pressure valve spring; and
wherein a pressure can be applied to the additional low-pressure piston surface via the gas from the capsule, such that the additional low-pressure piston spring is compressed, and the additional high-pressure valve is closed.

9. Apparatus according to claim 1, further comprising at least one nozzle connector for production of a fluidic connection between an exchangeable nozzle and the discharge opening.

10. Apparatus according to claim 9, wherein the at least one nozzle connector comprises an upper nozzle screw connection, which is disposed along the discharge opening; and
wherein an exchangeable nozzle is disposed in the upper nozzle screw connection.

11. System comprising an apparatus according to claim 1, further comprising a gas-filled capsule.

12. System according to claim 11, wherein the gas is argon.

13. System according to claim 11, wherein the capsule stands in a fluidic connection with the apparatus.

14. Apparatus according to claim 1, wherein the at least one nozzle connector further comprises a lower nozzle screw connection disposed along the discharge opening.

15. Apparatus according to claim 1, wherein the pressure-control valve feeds the high-pressure valve.

\* \* \* \* \*